US010708050B2

(12) United States Patent
Stanley (10) Patent No.: US 10,708,050 B2
(45) Date of Patent: Jul. 7, 2020

(54) MULTIVARIATE ENCRYPTION SYSTEMS AND METHODS

(71) Applicant: TOKENEX, LLC, Edmond, OK (US)

(72) Inventor: Justin Stanley, Bixby, OK (US)

(73) Assignee: TOKENEX, LLC, Edmond, OK (US)

(*) Notice: Subject to any disclaimer, the term of this patent is extended or adjusted under 35 U.S.C. 154(b) by 0 days.

(21) Appl. No.: 16/012,298

(22) Filed: Jun. 19, 2018

(65) Prior Publication Data

US 2019/0386827 A1 Dec. 19, 2019

(51) Int. Cl.
*H04L 29/06* (2006.01)
*H04L 9/14* (2006.01)
*G06F 21/62* (2013.01)

(52) U.S. Cl.
CPC ............ *H04L 9/14* (2013.01); *G06F 21/6245* (2013.01); *H04L 63/0428* (2013.01); *H04L 63/08* (2013.01); *H04L 63/20* (2013.01); *H04L 2209/04* (2013.01)

(58) Field of Classification Search
CPC ....... H04L 9/14; H04L 63/20; H04L 63/0428; H04L 63/08; H04L 2209/04; G06F 21/6245
See application file for complete search history.

(56) References Cited

U.S. PATENT DOCUMENTS

| 8,024,317 | B2 * | 9/2011 | Nair ........................ G06Q 30/02 707/709 |
| 8,032,508 | B2 * | 10/2011 | Martinez ............. G06F 16/9535 707/708 |
| 8,060,492 | B2 * | 11/2011 | Nair ....................... G06F 16/951 707/709 |
| 9,137,246 | B2 * | 9/2015 | Parry .................. H04L 63/0861 |
| 9,805,123 | B2 * | 10/2017 | Nair ....................... H04L 63/102 |
| 2011/0093719 | A1 | 4/2011 | Duhaime |
| 2013/0046993 | A1 | 2/2013 | Jueneman et al. |
| 2013/0080641 | A1 * | 3/2013 | Lui ......................... H04L 67/10 709/226 |
| 2014/0075201 | A1 * | 3/2014 | Hiwatari ............... H04L 9/3247 713/176 |
| 2015/0032626 | A1 | 1/2015 | Laxminarayanan |

(Continued)

FOREIGN PATENT DOCUMENTS

WO WO2011133494 10/2011

OTHER PUBLICATIONS

Vormetric Data Security Platform, Data Sheet, Feb. 12, 2016.

(Continued)

*Primary Examiner* — Mahfuzur Rahman
(74) *Attorney, Agent, or Firm* — John M. Behles (57) ABSTRACT

Multivariate encryption systems and methods are provided herein. An example method includes receiving a multivariate input set that includes a plurality of sensitive data objects arranged according to a record template, encrypting the multivariate input set into an encrypted representation, receiving a request for at least a portion of the plurality of sensitive data objects, extracting the at least a portion of the plurality of sensitive data object from the encrypted representation and generating a response message that includes only the at least a portion of the plurality of sensitive data objects that were extracted from the encrypted representation.

15 Claims, 5 Drawing Sheets

(56) References Cited

U.S. PATENT DOCUMENTS

| | | | |
|---|---|---|---|
| 2015/0281214 A1* | 10/2015 | Shirai | H04L 63/083 |
| | | | 726/7 |
| 2016/0352695 A1 | 12/2016 | Kozolchyk et al. | |
| 2017/0061138 A1* | 3/2017 | Lambert | H04L 63/18 |
| 2017/0093812 A1 | 3/2017 | Schenk et al. | |
| 2017/0147805 A1* | 5/2017 | Ichikawa | G06F 21/34 |
| 2017/0228526 A1* | 8/2017 | Cudak | H04L 63/0861 |
| 2017/0243028 A1* | 8/2017 | LaFever | G06F 21/6254 |
| 2017/0339168 A1* | 11/2017 | Balabine | G06F 16/951 |
| 2018/0307859 A1* | 10/2018 | LaFever | G06F 21/6254 |

OTHER PUBLICATIONS

WO2019246077—WOSA—Dec. 26, 2019—8919.
WO2019246077—PAMPH—Dec. 26, 2019—2663.
WO2019246077—ISR—Dec. 26, 2019—8918.
US2019037704—IASR.

\* cited by examiner

MULTIVARIATE ENCRYPTION SYSTEMS AND METHODS

CROSS REFERENCE TO RELATED APPLICATIONS

N/A

FIELD OF THE PRESENT DISCLOSURE

The present disclosure relates generally to data security, and more specifically, but not by limitation, to systems and methods of multivariate encryption. These systems and methods provide for tokenization and masking of sensitive multivariate data.

SUMMARY

Various embodiments of the present disclosure are directed to a method, comprising: receiving a multivariate input set comprising a plurality of sensitive data objects arranged according to a record template; encrypting the multivariate input set into an encrypted representation; receiving a request for at least a portion of the plurality of sensitive data objects; extracting the at least a portion of the plurality of sensitive data object from the encrypted representation; and generating a response message that includes only the at least a portion of the plurality of sensitive data objects that were extracted from the encrypted representation.

Various embodiments of the present disclosure are directed to a method, comprising: receiving a multivariate input set comprising a plurality of sensitive data objects arranged according to a record template; encrypting the multivariate input set into an encrypted representation, the encrypted representation being a token; transmitting the token to a requestor; receiving, from a requestor, a request for at least a portion of the plurality of sensitive data objects, the request comprising the token; decrypting the encrypted representation; and generating a response message that includes the multivariate input set, wherein only the at least a portion of the plurality of sensitive data objects are displayable and remaining portions of the sensitive data objects are masked.

Various embodiments of the present disclosure are directed to a system, comprising: an encryption module configured to encrypt a multivariate input set into an encrypted representation, the encrypted representation being a token, wherein the multivariate input set comprising a plurality of sensitive data objects arranged according to a record template; an interface configured to: transmit the token to a requestor; and receive, from a requestor, a request for at least a portion of the plurality of sensitive data objects, the request comprising the token; a decryption module configured to decrypt the encrypted representation; and a processor module configured to generate a response message that includes the multivariate input set, wherein the processor module applies masking rules to the multivariate input set such that only the at least a portion of the plurality of sensitive data objects are displayable and remaining portions of the sensitive data objects are masked.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXEMPLARY EMBODIMENTS

For context, it will be understood that many types of digital transactions rely on the use of encryption or tokenization of data for purposes of data privacy and security. For example, in response to payment card industry (PCI) compliance requirements, a credit card number (e.g., sensitive information) can be tokenized and stored for later use. The encryption/tokenization of the credit card number allows those who require credit card processing, such as merchants, to remove (or reduce in some instances) the scope of PCI requirements for their systems such as point of sale systems. Numerous other examples where encryption of single instances (or concatenated sets) of sensitive data is required would be known to one of ordinary skill in the art. An example of a concatenated set of data could include a credit card number, expiration date, and card holder name. While these data can be encrypted together there is no way of selectively extracting or returning only a portion of this concatenated set when required. Thus, when decrypted, the entire concatenated set is returned. For example, while an EMR can be encrypted, there does not exist a solution whereby only selected portions of the EMR can be returned upon request without exposing the entirety of the EMR. This is particularly deleterious as certain medical record systems use only (or should only be granted access to) portions of an EMR.

These issues increase in specific areas such as electronic medical records (EMR), which include structured data records that are multivariate. An EMR for a patient may have dozens, hundreds, or even thousands of variables or data objects. Each of the data objects in the EMR may or may not be subject to privacy rules, such as HIPAA.

Moreover, systems that rely on using EMRs frequently only need portions of an EMR. Exposing other portions of the EMR to unauthorized systems potentially violates privacy laws. For example, one system may require only the last four digits of a patient's social security number, and a second system may require only a patient name and data of birth. The permutations of what each system requires may be of endless number.

Exposure of more of the EMR than is necessary for the system to function may result in the violation of one or more privacy rules, such as HIPAA, for example. Thus, ensuring that each system or user is only provided access to the portion of the EMR for which they are authorized to possess is a particular technical problem for which there is no existing solution.

Furthermore, many other industries and other system types function using only a portion of an electronic record or data set. By way of non-limiting example, an electronic auction or marketplace may maintain multivariate user records. Systems within electronic auction or marketplace may utilize only a portion of these multivariate user records. Each of the systems may be authorize only to receive one or more types of data objects of a multivariate user record. Thus, a technical solution is required in which a multivariate record can be encrypted for storage, and where needed, the multivariate record can be decrypted and provided to a requesting system in such a way that only a portion of the multivariate record required for the system is provided. Some embodiments include extracting on the portions of the multivariate record needed. Other embodiments allow for the application of masking rules in order to obfuscate or mask portions of the multivariate record that the system should not, or does not, need to access. Thus, the system will be provided access to only that which they are authorized to view, while remaining portions of the record are masked. These and other advantages of the present disclosure are provided herein in greater detail below with reference to the collective drawings.

Figure 1:
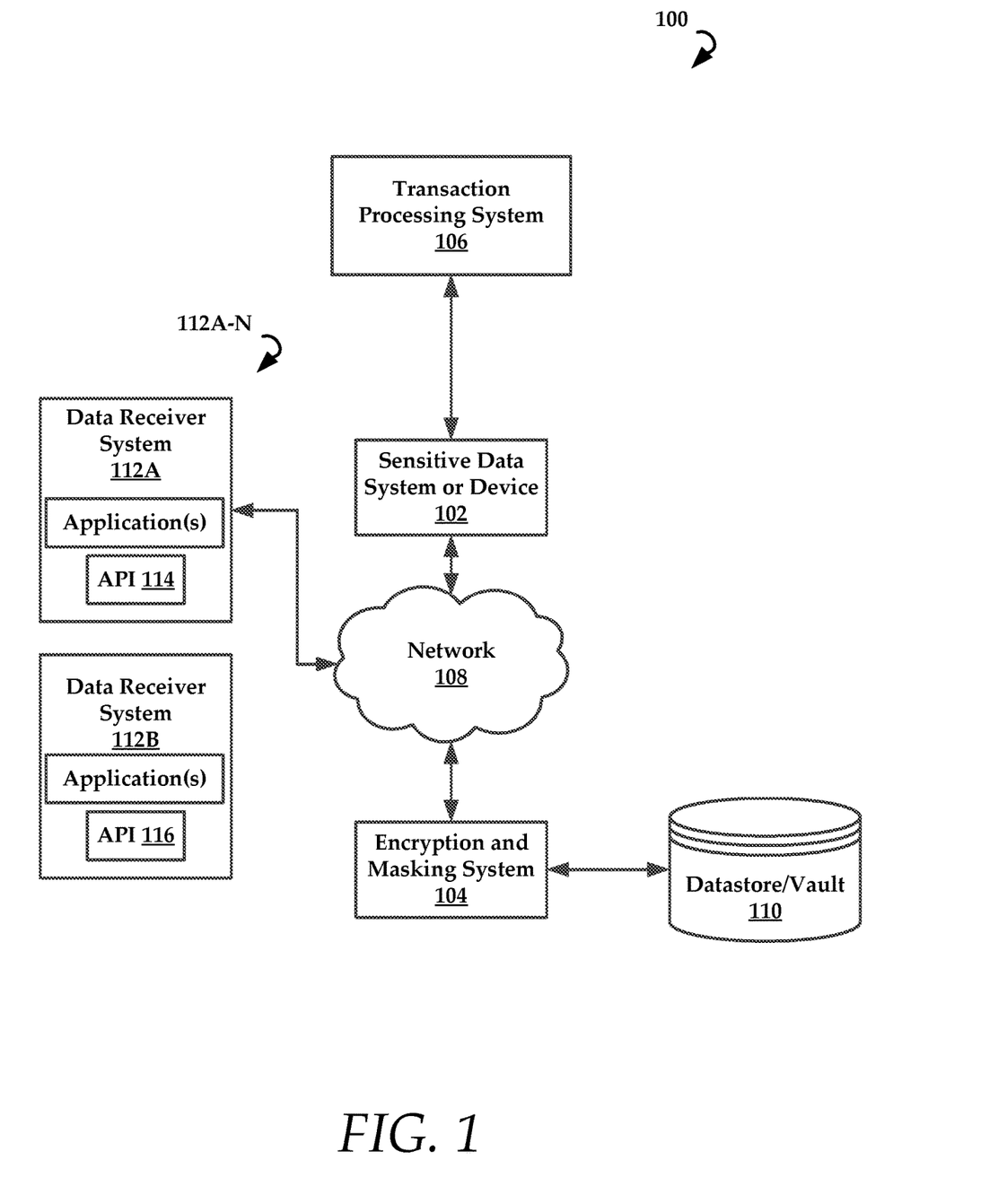
FIG. 1 is a schematic diagram of an example security architecture for encrypting and masking information, constructed in accordance with the present disclosure.

FIG. 1 is a schematic diagram of an example computing architecture or system 100. In some embodiments, the system 100 comprises a sensitive data system 102, an encryption and masking system 104, and optionally a transaction processing system 106.

In some embodiments, the sensitive data system 102 is an end point computer system that receives and utilizes sensitive data. In various embodiments, the sensitive data system 102 is communicatively coupled with the encryption and masking system 104 through a network 108. The network 108 can comprise any public and/or private network that would be known to one of ordinary skill in the art with the present disclosure before them.

In some embodiments, the sensitive data can be obtained from a medical record that includes a physical medical record that has been processed into a digital format. This can include using, for example, optical character recognition (OCR) or other similar technologies. Thus, the methods utilized herein can be used to transform a digital representation of a record that is based on an underlying physical document.

In general, the sensitive data system 102 provides sensitive data objects to the encryption and masking system 104 over the network. In some embodiments, the sensitive data objects are referred to as a multivariate input set. In one example, a multivariate input set could include a user record that includes a plurality of field types and corresponding values. By way of non-limiting example, a user record could include the following:

| First Name | John |
| Last Name | Doe |
| SSN | 123-12-1234 |
| DOB | 01/01/2001 |

While the multivariate input set is illustrated in table format, it will be understood that the multivariate input set can be in another format such as First Name=John; Last Name=Doe; SSN=123-12-1234; DOB=Jan. 1, 2001. In some embodiments, a record template is linked to sensitive information system or data receiver system (or even potentially a specific application) using a unique identifier that is indicative of an end user, entity, or application.

This set within the user record is a multivariate input set because the data comprise a plurality of different types of data. In some instances, each data type may have a different sensitivity level. For example, the entire social security number may be highly sensitive while the year of the date of birth may be less sensitive in comparison. The level of sensitivity is determined by what data privacy law is under consideration. Some data fields may be considered sensitive data under one privacy law, whereas the same data might not be considered sensitive under a different privacy law.

In some embodiments, the encryption and masking system 104 provides the sensitive data system 102 with a record template that can be configured by a user to include field types and corresponding value formats. An example record template would be formatted as follows:

| First Name | X |
| Last Name | X |
| SSN | XXX-XX-XXXX |
| DOB | MM/DD/YYYY |

To be sure, the Date of Birth value format is notable because it specifies the format of dates that are acceptable for use in the sensitive data system 102. For data fields that have an established or immutable format, such as a social security number, there is no need to specify the value format explicitly. Thus, some field values have a defined format that is specified by the end user and some require no explicit value format.

In various embodiments, the record template is created on a system-by-system basis or on an application-by-application basis. In some instances, the record template is a consistent format used across an organization or per entity. A non-limiting example would include a format for an EMR. Another non-limiting example would be a format for a customer record for an e-commerce system.

In one or more embodiments, the encryption and masking system 104 is configured to ingest an example or seed record provided by the sensitive data system 102 and generate the record template. The encryption and masking system 104 can utilize keyword matching or natural language parsing to determine field types and corresponding value formats.

According to some embodiments, each record template can be associated with a unique template identifier that links back to the sensitive data system 102 or entity in control of the sensitive data system 102 such as an enterprise.

Regardless of the process used to generate the record template, the sensitive data system 102 will then utilize the record template by inputting a multivariate input set into the record template.

Once the multivariate input set is entered, the sensitive data system 102 transmits the formatted multivariate input set to the encryption and masking system 104. In some embodiments, the sensitive data system 102 utilizes an application programming interface (API) to communicatively couple with the encryption and masking system 104. In various embodiments, the API can be application specific such that each application executing on the sensitive data system 102 has its own unique API.

When a formatted multivariate input set is received by the encryption and masking system 104, the encryption and masking system 104 can initially authenticate the sensitive data system 102 through the API. In some embodiments, each API is specifically configured or identified for linking with a particular set of masking rules as will be discussed in greater detail infra.

In some embodiments, the encryption and masking system 104 stores one or more example record templates for each sensitive data system 102. When a formatted multivariate input set is received it is compared against the example record templates to determine if a format of the formatted multivariate input set complies with the example record templates. If the format matches, the formatted multivariate input set can be further processed. When the format does not match, the formatted multivariate input set is rejected and a message can be transmitted back to the sensitive data system 102 that the formatted multivariate input set was rejected.

If the formatted multivariate input set is authorized, the encryption and masking system 104 can encrypt the formatted multivariate input set using any desired encryption standard such as advanced encryption standard (AES) 256. The formatted multivariate input set is thus transformed into a token.

In some embodiments, the token is stored in a vault or datastore 110. In accordance with the present disclosure, each token is immutable, although an underlying record or individual fields of the underlying record can be changed. In any case, the token is a pointer or link to the underlying record.

In various embodiments, the vault or datastore 110 is for use by a single enterprise or company. Each token can be associated with a unique token identifier in some embodiments. While AES 256 has been disclosed, one of ordinary skill in the art will appreciate that other methods of encryption can likewise be utilized in accordance with the present disclosure. In accordance with the present disclosure, the encryption and masking system 104 can return the token to the sensitive data system 102 for storage.

In some instances, the system 100 can include a plurality of data receiver systems 112A-N. In one or more embodiments, the sensitive data system 102 can be part of the plurality of data receiver systems 112A-N. For purposes of explaining various advantages of the present disclosure, it will be assumed that each of the plurality of data receiver systems 112A-N is associated with an application that requires a specific portion of the multivariate input set stored as the token. For example, data receiver system 112A is a credit checking system that requires a last name field and last four digits of the social security field. Data receiver system 112A utilizes API 114 for one particular application. In contrast, the data receiver system 112B provides an application that requires use of the first and last name fields, as well as the date of birth year. Data receiver system 112B utilizes API 116 for one particular application. Another example data receiver system might require all of the fields of the multivariate input set.

It will be understood that an application may utilize only a portion of a field from the multivariate input set. For example, the data receiver system 112B uses the date of birth year only, not the month or day. Allowing for more granular extraction or return of only portions of field values allows for systems and application to access only that information which is necessary for executing an associated application. Granting access to more than what is allowed or necessary increases the chances that an application or system will violate a data privacy law. Also, providing a system or application with superfluous information creates computing overhead that is deleterious inasmuch as data transmission and processing requires computing resources. Thus, reducing data provided to data receiver systems improves computing efficiency and data security.

As noted above with respect to the sensitive data system 102, the data receiver systems 112A-N may communicate with the encryption and masking system 104 using a specifically configured API that embeds information regarding masking rules that are applied to any data received from the encryption and masking system 104. Thus, the API instructs the encryption and masking system 104 as to which masking or extracting rules to apply to a decrypted cypher token (e.g., multivariate input set). The application of masking rules will cause a portion of the multivariate input set to be obscured to the data receiver system. In contrast, when an extraction rule is applied only the portion of data required by the data receiver system is extracted from the decrypted cypher token (e.g., multivariate input set) and transmitted back to the data receiver system.

In more detail, when a data receiver system transmits a request for data to the encryption and masking system 104, the request can include the encrypted token. The encryption and masking system 104 can first decrypt the token to recover the multivariate input set that is arranged according to the record template utilized. The encryption and masking system 104 will decrypt the encrypted token stored in the vault and then compare a structure of the multivariate input set received from the sensitive data system with the structure multivariate input set extracted from the encrypted token stored in the vault or datastore. If an exact match is found, the encryption and masking system 104 will proceed to either masking or extracting. When an exact match is not found, the encryption and masking system 104 will terminate the process and optionally transmit a warning message to the data receiver system that requested the data. The comparative matching is made possible due to the fact that the encrypted text stored in the vault is immutable.

Assuming a masking method is being used once the multivariate input set is recovered the encryption and masking system 104 will apply a masking ruleset to the multivariate input set. Again, the masking rules applied to the multivariate input set can be application or data receiver system specific (as indicated in the API used). Using the examples above, data receiver system 112A would receive the following:

| | |
|---|---|
| First Name | X |
| Last Name | Doe |
| SSN | XXX-XX-1234 |
| DOB | XX/XX/XXXX |

To be sure, the data received may not be set forth in a table format, but could include a string such as First Name=X, Last Name=Doe, SSN=XXX-XX-1234, DOB=XX/XX/XXXX. Thus, the first name field and value are masked, as well as the initial five digits of the social security number field and value. All digits of the date of birth are masked. Again, the fields or field segments that are masked are based on a masking ruleset associated with the application or the API used by the data receiver system. One of ordinary skill in the art will appreciate that other methods for indicating how masking rules can be linked to a specific masking ruleset are also likewise contemplated for use. For example, the masking ruleset could be linked to the application or data receiver system with a specific unique identifier. Another example would be linking a masking ruleset to a computing device identifier, such as an IMEI or MAC address of the data receiver system.

In examples where the encryption and masking system 104 uses extraction rules, the encryption and masking system 104 can extract only those parts of the decrypted multivariate input set to which the requesting system (e.g., data receiver system) is authorized to receive. Using the example above, the data receiver system 112A would receive the following: Last Name=Doe, SSN=1234. As with masking rulesets, the extraction rulesets are application and/or data receiver system specific. The extraction rulesets are associated with the application and/or data receiver system through API instructions, unique identifiers, or any other similar mechanism.

Figure 2:
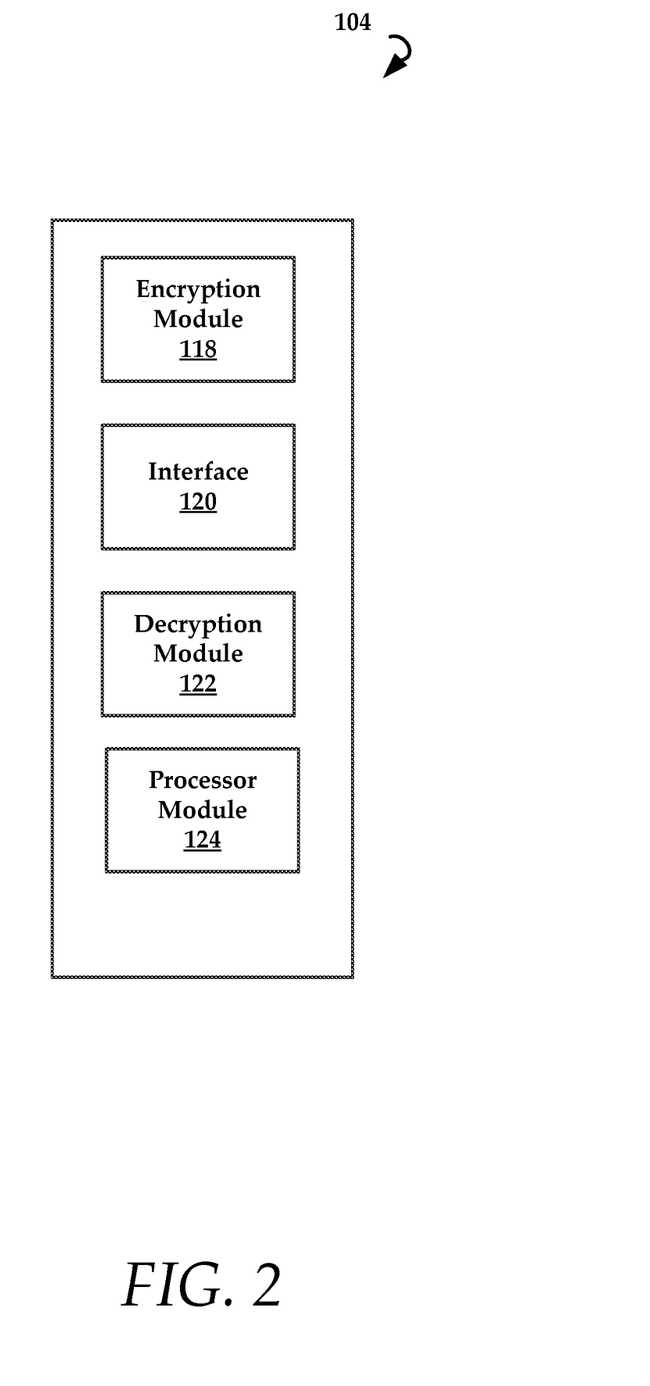
FIG. 2 is a schematic diagram of an example encryption and masking system of the architecture of FIG. 1.

FIG. 2 is a schematic diagram of an example embodiment of the encryption and masking system 104. In some embodiments, the encryption and masking system 104 comprises an encryption module 118, an interface 120, a decryption module 122, and a processor module 124. In some embodiments, multiple modules can be combined, such as the encryption and decryption modules 118, 122.

In some embodiments, encryption module 118 comprises an encryption module configured to encrypt a multivariate input set into an encrypted representation. In one embodiment, the encrypted representation is a cypher token. As noted above, the multivariate input set comprises a plurality of sensitive data objects arranged according to a record template.

In various embodiments, the interface 120 is configured to receive multivariate input sets that comprise sensitive information, transmit tokens to a requestor (e.g., data receiver system and/or sensitive information system), and receive requests for at least a portion of the plurality of sensitive data objects. The interface 120 is also used to transmit masked or extracted data from decrypted multivariate input sets recovered from encrypted tokens stored in a vault.

In some embodiments, the decryption module 122 is configured to decrypt the encrypted representation (e.g., encrypted token stored in a vault). The processor module 124 is then executed to generate a response message that includes the multivariate input set. In some embodiments, only a portion of the plurality of sensitive data objects in the multivariate input set is displayable and remaining portions of the sensitive data objects are masked. This process is facilitated by the processor module 124 applying a masking ruleset to the decrypted multivariate input set that was extracted from the encrypted token.

Figure 3:
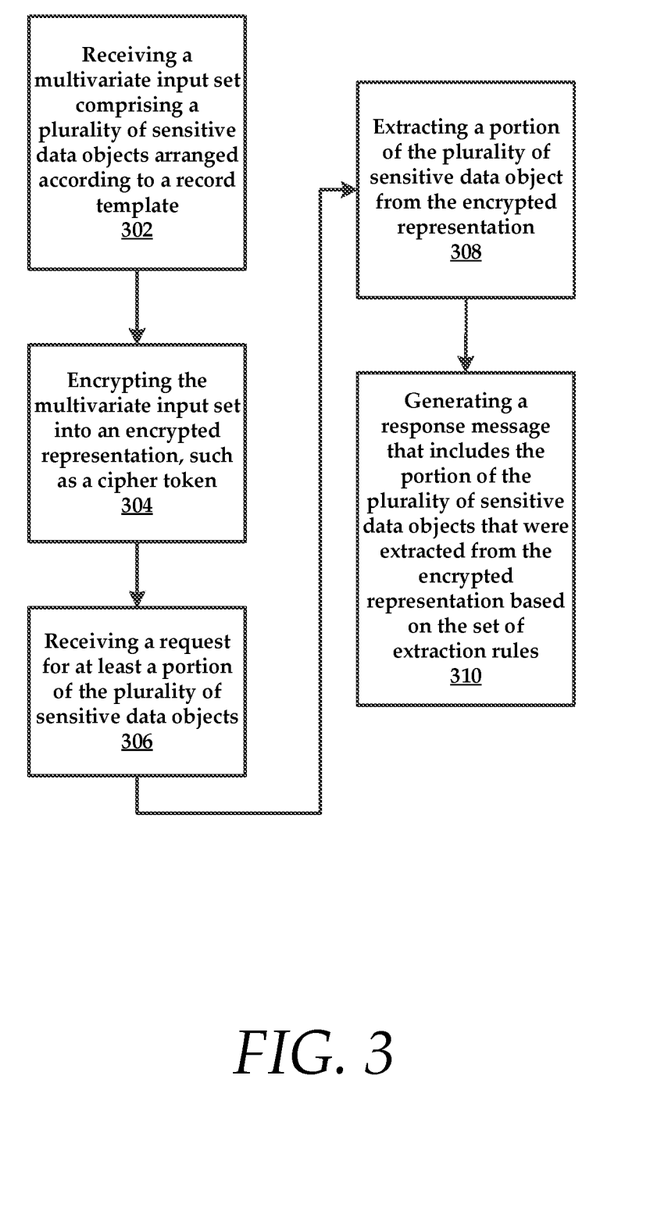
FIG. 3 is a flow diagram of an extraction method performed by an example encryption and masking system.

FIG. 3 is a flowchart of an example method of the present disclosure. The method is executed by an example encryption and masking system as disclosed herein. The method includes a step 302 of receiving a multivariate input set comprising a plurality of sensitive data objects arranged according to a record template.

Although not illustrated in this embodiment, the method can include steps related to the authentication of the requesting device before additional steps are undertaken. For example, authenticating a requestor can be accomplished by comparing the multivariate input set received in the request for at least a portion of the plurality of sensitive data objects with the encrypted representation. When a match is found between the multivariate input set and the encrypted representation the requestor (e.g., system or application) is authenticated.

Next, the method includes a step 304 of encrypting the multivariate input set into an encrypted representation, such as a token. The token can be stored in a vault or datastore in some embodiments.

In accordance with the present disclosure, the method can include a step 306 of receiving a request for at least a portion of the plurality of sensitive data objects. As noted above, this can occur through use of a specifically configured API. The request can include a stored copy of the token in the possession of the requesting system (e.g., data receiver system). The method can include steps such as authenticating and/or validating the token by decrypting the token and comparing the decrypted token in the possession of the requesting system with a decrypted version of the token stored in the vault.

In instances where extraction rules are utilize, the method includes a step 308 of extracting a portion of the plurality of sensitive data object from the encrypted representation. The portion that is extracted is based on a set of extraction rules applied based on the requesting system or an application executing on the requesting system.

In some embodiments, the method includes a step 310 of generating a response message that includes the portion of the plurality of sensitive data objects that were extracted from the encrypted representation based on the set of extraction rules.

Figure 4:
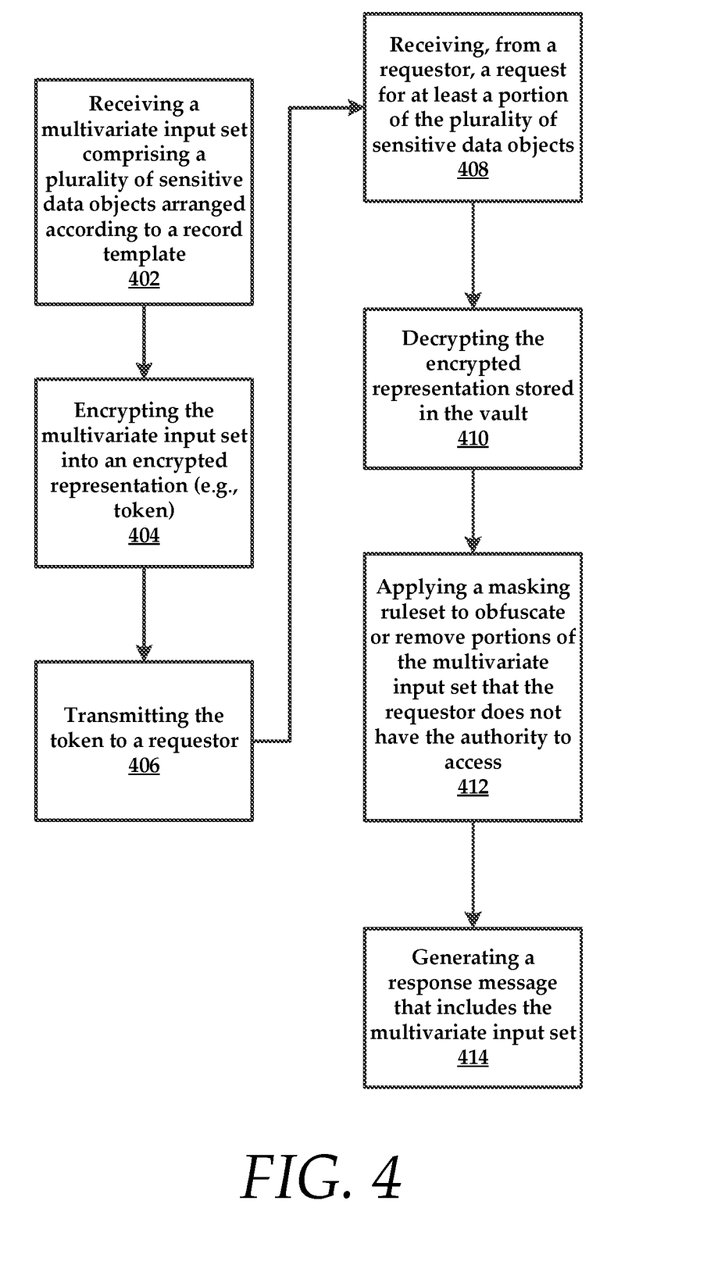
FIG. 4 is a flow diagram of an example masking method performed by an example encryption and masking system.

FIG. 4 is a flowchart of another example method executed by an example the encryption and masking system of the present disclosure. In contrast with the example embodiment of FIG. 3 that involves the extraction of data, the method of FIG. 4 includes masking of data.

In some embodiments, the method includes a step 402 of receiving a multivariate input set comprising a plurality of sensitive data objects arranged according to a record template. In some embodiments, the record template is automatically generated from prior example or seed records. For example, one or more example records are provided to the system and the system learns the layout and fields of the one or more example records and automatically generates a record template therefrom.

In some embodiments, the method includes a step 404 of encrypting the multivariate input set into an encrypted representation. As noted above, the encrypted representation is a token in some embodiments. The method can also include immutably storing the encrypted representation in a vault. In various embodiments, the method includes a step 406 of transmitting the token to a requestor (e.g., data receiver system).

When a requestor (e.g., application or device) needs to utilize data included in the encrypted representation, the requestor will send a request for the information to the vault. Thus, the method includes a step 408 of receiving, from a requestor, a request for at least a portion of the plurality of sensitive data objects. In some embodiments the request comprises the token. As mentioned above, the request is transmitted over a network connection using an API that specifically identifies any of an application and/or a computing device.

A request for a portion of the plurality of sensitive data objects in a stored token or other encrypted representation comprises any of the multivariate input set used to generate the encrypted representation and the token In one or more embodiments, the method includes a step 410 of decrypting the encrypted representation stored in the vault and a step 412 of applying a masking ruleset to obfuscate or remove portions of the multivariate input set that the requestor does not have the authority to access.

In some instances, decrypting the encrypted representation comprises recovering the multivariate input set. It will be understood that remaining portions of the sensitive data objects are replaced with masking characters.

Selection of the masking ruleset is based on a linking between the requestor and a masking ruleset. For example, an application will utilize an API that is embedded with information that identifies a masking ruleset that is to be applied to a multivariate input set.

In various embodiments, the method includes a step 414 of generating a response message that includes the multivariate input set. Because a masking ruleset was applied, only a portion of the plurality of sensitive data objects are displayable and remaining portions of the sensitive data objects are masked. Masking can include replacing characters with a masking character such as X or any other arbitrary character.

In some embodiments, the method includes associating the record template with a unique identifier that is indicative of an end user, entity, or application. Also, as with other embodiments, the method can include a step of authenticating the requestor by comparing the multivariate input set received in the request for at least a portion of the plurality of sensitive data objects with the encrypted representation. When a match is found between the multivariate input set and the encrypted representation the requestor is authenticated. Again, this process can occur prior to the system decrypting the data stored in the vault.

According to some embodiments, a multivariate input set can also comprise an exchangeable or replaceable variable in place of a field value. For example, in a multivariate input set that comprises First Name=X, Last Name=Doe, SSN=1NKENRT3U, DOB=XX/XX/XXXX, where the SSN field value is itself a token. When a token is encountered by a system of the present disclosure, the system will verify the token with a stored copy of the token, which may be stored in the same datastore (or potentially a different datastore) as the encrypted version of the multivariate input set. If the token is verified by match, the system can decrypt the token and replace the token in the multivariate input set with the plaintext (e.g., decrypted value). For example, a masked an returned multivariate input set would include First Name=X, Last Name=Doe, SSN=123-12-1234, DOB=XX/XX/XXXX, where 123-12-1234 is the decrypted plaintext obtained from the token 1NKENRT3U. If desired, portions of the decrypted plaintext can also be masked in some embodiments.

The following paragraphs are descriptive of an example code-based implementation of a tokenization and masking process utilizing JSON. An example record schema code implementation allows for a record schema that defines a person with specific properties (e.g., attributes) with a format of type/object pairs:

Record Schema
{
  "description": "A person",
  "type": "object",
  "properties":
  {
  "firstName": {"type":"string", "pattern": "^[A-Za-z]{2,50}$"},
  "lastName": {"type":"string", "pattern": "^[A-Za-z]{2,50}$"},
  "dob": {"type":"string", "pattern": "^[0-9]{2}\/[0-9]{2}\/[0-9]{4}$"},
  "ssn": {"type":"string", "pattern": "^[0-9]{9}$"},
  "driverLicense": {"type":"string", "pattern": "^[A-Za-z]{2,20}$"}
  }
}

An example masking rule code implementation below defines the specific masking rules that are applied to a record using the record schema above:

Masking Rule
{
  "name": "MyMaskingRule1"
  "description": "this mask rule masks the full ssn and partial dob",
  "maskrules": [{
  "path": "dob",
  "selector": "([0-9]{2}\/)([0-9]{2})(\/[0-9]{4})",
  "mask": "$1xx$3"
  },
  {
  "path": "ssn",
  "selector": "(0-9]{5})([0-9]{4})",
  "mask": "xxxxx$2"
  }
  ]
}

An example record that is to be processed includes:
Record
{
  "firstName": "Justin",
  "lastName": "Stanley",
  "dob": "01/01/1970",
  "ssn":"123456789",
  "driver License": "abcdefg"
}

An example masked version of the record includes:
Masked Record
{
  "firstName": "Justin",
  "lastName": "Stanley",
  "dob": "01/xx/1970",
  "ssn":"xxxxx6789",
  "driver License": "abcdefg"
}

As can be seen above, aspects of the social security number in the record and the date of birth are masked. The masked record above can be formatted for the end user in any number of ways as would be known to one of ordinary skill in the art. In some instances, the masked version is returned in the format illustrated above.

Figure 5:
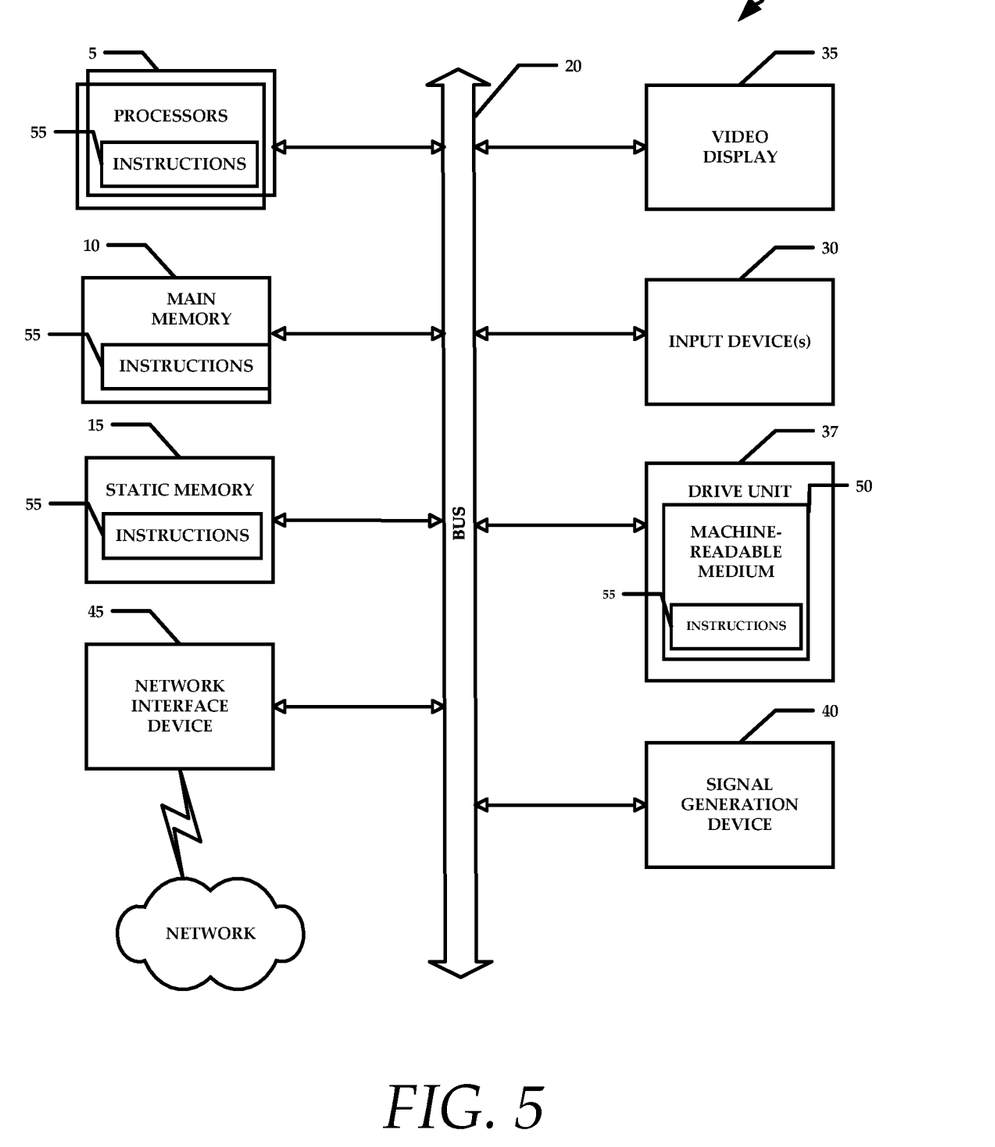
FIG. 5 is a schematic diagram of an example computer system that can be used to practice aspects of the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   receiving a multivariate input set comprising a plurality of sensitive data objects arranged according to a record template;
   encrypting the multivariate input set into an encrypted representation;
   receiving a request for at least a portion of the plurality of sensitive data objects from a requestor, the request for at least a portion of the plurality of sensitive data objects comprising any of the multivariate input set used to generate the encrypted representation;
   authenticating the requestor by comparing the multivariate input set received in the request with the encrypted representation, when a match is found between the multivariate input set and the encrypted representation the requestor is authenticated;

extracting the at least a portion of the plurality of sensitive data object from the encrypted representation; and generating a response message that includes only the at least a portion of the plurality of sensitive data objects that were extracted from the encrypted representation.

2. The method according to claim 1, further comprising associating the record template with a unique identifier that is indicative of an end user, entity, or application.

3. The method according to claim 1, further comprising storing the encrypted representation in a datastore.

4. The method according to claim 1, wherein the encrypted representation is a token, the method further comprising transmitting the token to a requestor that provided the multivariate input set.

5. The method according to claim 4, wherein the request for at least a portion of the plurality of sensitive data objects comprises any of the multivariate input set used to generate the encrypted representation and the token.

6. A method, comprising:

receiving a multivariate input set comprising a plurality of sensitive data objects arranged according to a record template;

encrypting the multivariate input set into an encrypted representation, the encrypted representation being a token;

transmitting the token to a requestor;

receiving, from a requestor, a request for at least a portion of the plurality of sensitive data objects, the request comprising the token, the request for at least a portion of the plurality of sensitive data objects comprising any of the multivariate input set used to generate the token;

authenticating the requestor by comparing the multivariate input set received in the request with the encrypted representation, when a match is found between the multivariate input set and the encrypted representation the requestor is authenticated;

decrypting the encrypted representation; and generating a response message that includes the multivariate input set, wherein only the at least a portion of the plurality of sensitive data objects are displayable and remaining portions of the sensitive data objects are masked.

7. The method according to claim 6, further comprising associating the record template with a unique identifier that is indicative of an end user, entity, or application.

8. The method according to claim 6, wherein decrypting the encrypted representation comprises recovering the multivariate input set, and further wherein the remaining portions of the sensitive data objects are replaced with masking characters.

9. The method according to claim 6, further comprising generating the record template from one or more example records of the requestor.

10. The method according to claim 6, further comprising:

transmitting the record template to the requestor; and receiving the multivariate input set in the record template.

11. A system, comprising:

an encryption module configured to encrypt a multivariate input set into an encrypted representation, the encrypted representation being a token, wherein the multivariate input set comprising a plurality of sensitive data objects arranged according to a record template;

an interface configured to:

transmit the token to a requestor; and receive, from a requestor, a request for at least a portion of the plurality of sensitive data objects, the request comprising the token, wherein the request for at least a portion of the plurality of sensitive data objects comprises any of the multivariate input set used to generate the encrypted representation and the token;

authenticate the requestor by comparing the multivariate input set received in the request for at least a portion of the plurality of sensitive data objects with the encrypted representation, wherein when a match is found between the multivariate input set and the encrypted representation the requestor is authenticated;

a decryption module configured to decrypt the encrypted representation; and a processor module configured to generate a response message that includes the multivariate input set, wherein the processor module applies masking rules to the multivariate input set such that only the at least a portion of the plurality of sensitive data objects are displayable and remaining portions of the sensitive data objects are masked.

12. The system according to claim 11, wherein the encryption module is further configured to associate the record template with a unique identifier that is indicative of an end user, entity, or application.

13. The system according to claim 11, wherein the encrypted representation is stored in a vault of the requestor on a datastore.

14. The system according to claim 11, further comprising a templating module that generates the record template from one or more example records from the requestor.

15. The system according to claim 11, wherein the interface is further configured to:

transmitting the record template to the requestor; and receiving the multivariate input set in the record template.

* * * * *